(12) United States Patent
Larson

(10) Patent No.: US 6,360,979 B1
(45) Date of Patent: Mar. 26, 2002

(54) TAKEUP LEADER FOR SINGLE REEL TAPE DRIVES WITH INCREASED FLEXIBILITY FOR IMPROVED PERFORMANCE

(75) Inventor: David Larson, Boulder, CO (US)

(73) Assignee: Benchmark Storage Innovations, Inc., Boulder, CO (US)

(*) Notice: Subject to any disclaimer, the term of this patent is extended or adjusted under 35 U.S.C. 154(b) by 0 days.

(21) Appl. No.: 09/619,978

(22) Filed: Jul. 20, 2000

(51) Int. Cl.[7] ............................................. G03B 1/58
(52) U.S. Cl. ............................. 242/332.4; 242/532.1
(58) Field of Search ............................ 242/352.4, 338, 242/338.2, 348, 532.1, 532.6, 532.7, 582, 332.2, 332.4, 347.1, 348.2; 360/95, 96.5

(56) References Cited

U.S. PATENT DOCUMENTS

| | | | | |
|---|---|---|---|---|
| 3,980,254 A | * | 9/1976 | Coon et al. | 242/348.2 |
| 4,572,460 A | * | 2/1986 | Hertrich | 242/332.4 |
| 4,720,913 A | * | 1/1988 | Hertrich | 242/332.4 |
| 5,845,860 A | * | 12/1998 | Tohji et al. | 242/332.4 |

* cited by examiner

Primary Examiner—William A. Rivera
(74) Attorney, Agent, or Firm—Patton Boggs LLP

(57) ABSTRACT

A flexible takeup leader that prevents a deformation in the takeup leader from causing a tape drive failure. The takeup leader comprises an elongated main body integrally formed between a first end and a second end. The elongated main body includes a plurality of apertures formed in at least one section of the elongated main body that corresponds to at least one curvilinear point around a guide roller when the tape drive is in the unloaded condition. The apertures increase the flexibility of the takeup leader to prevent tape drives from realizing erratic behavior caused by a deformed takeup leader. The increased flexibility permits the tape drive to pull a deformed takeup leader through a curvilinear tape path with a substantially smooth motion.

9 Claims, 3 Drawing Sheets

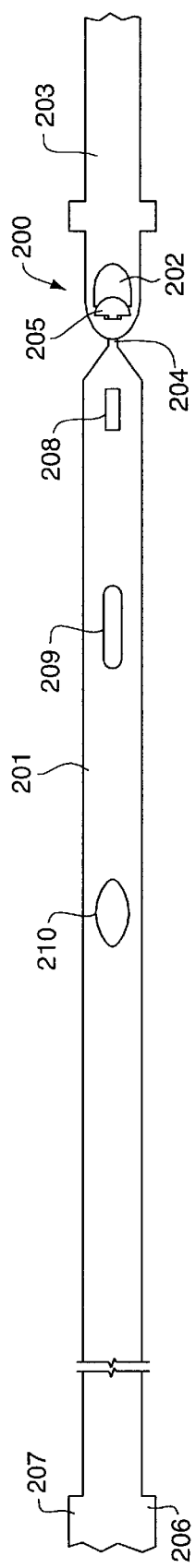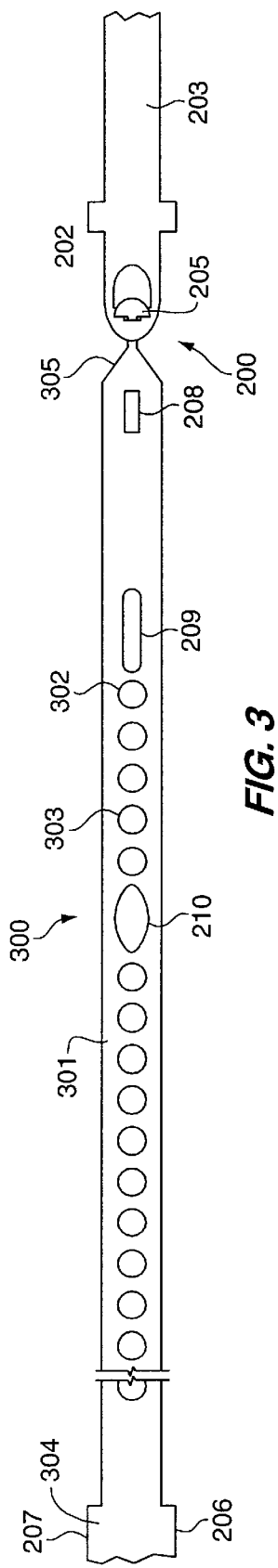

TAKEUP LEADER FOR SINGLE REEL TAPE DRIVES WITH INCREASED FLEXIBILITY FOR IMPROVED PERFORMANCE

FIELD OF THE INVENTION

The invention relates to digital tape drive storage devices, and in particular, to a takeup leader having increased flexibility to prevent deformation errors and provide improved performance characteristics in single reel tape drives.

PROBLEM

Digital data is stored on tape drives utilizing a variety of designs, but in all cases, magnetic tape media is wound between a pair of tape reels as data is transferred to or from the tape media. In the art of data storage, the physical space required to store data is an important concern. Referring to FIGS. 1–2, to conserve space, tape drives often use a single reel tape cartridge design shown in FIG. 1, which utilizes a supply reel located within a removable tape cartridge (not shown) and a takeup reel 101 located within the tape drive 100.

After the tape cartridge is inserted into the tape drive 100, the tape media must be loaded into the tape drive 100. The loading operation includes connecting the tape media to the takeup reel 101 and winding the tape media to a start point or read position adjacent a tape head 112. Various methods have been employed to make this connection. FIG. 2 illustrates one such method wherein the tape media connects to the takeup reel 101 via a buckle 200 between a tape cartridge leader 203 and a takeup leader 201. The tape cartridge leader 203 terminates the tape media at one end and is a strong flexible plastic strip that includes an ovular aperture 202 configured to mate with the takeup leader 201. The takeup leader 201 is a similar strong flexible plastic strip that attaches at one end to the takeup reel 101 using a pair of integrally formed flanges 206 and 207. The opposing end includes a stem 204 and a tab 205 designed to buckle with the ovular aperture 202 on the tape cartridge leader 203.

The takeup leader 201 also includes apertures 209, 210 and 208. When a tape cartridge is not present in the tape drive 100, the takeup leader 201 is wound around a plurality of guide rollers 102–105 in a curvilinear tape path and is secured by a rotating catch 106 through the aperture 208. During operation of the tape drive 100, the catch 106 is rotated to an out of the way position for winding of the tape media between the takeup reel 101 and the tape cartridge. Subsequent to operation of the tape drive 100, the aperture 209 is used by the tape drive 100 to detect when the takeup leader 201 and the tape cartridge leader 203 are in an unbuckled position for ejection of the tape cartridge. The aperture 210 is configured so that the buckle 200, between the takeup leader 201 and the tape cartridge leader 203, will align with the aperture 210 to reduce the effect of the added height of the buckle 200 during winding around the takeup reel 101.

Under normal conditions, the curvilinear tape path will not permanently deform the takeup leader 201 during inactive periods when no tape cartridge is present in the tape drive 100. Unfortunately however, if the tape drive 100 is exposed to extreme temperatures above one hundred and thirty degrees Fahrenheit, the takeup leader 201 permanently deforms at the curvilinear points in the tape path, such as where the takeup leader 201 wraps around the guide rollers 102–105. Once deformed, the takeup leader 201 introduces erratic motion as it is pulled through the tape path. For example, during winding, the takeup leader 201 can stall as deformed sections pass over each of the guide rollers 102–105 in the tape path. The stall causes erratic motions in the loading operation, as the force required to pull the deformed section over the guide rollers 102–105 builds up, and is quickly released when the deformed section is pulled over an individual guide roller, e.g. 102.

Also unfortunately, the extreme temperatures that cause deformation of the takeup leader 201 are most often encountered during shipping, where large numbers of tape drives are affected. For example, in hot climates during the summer, long term exposure to the sun from being left on a shipping dock or in a truck can damage an entire shipment of tape drives. When this occurs the entire shipment of drives will have reduced loading and unloading performance.

SOLUTION

The present invention overcomes the problems outlined above and advances the art by providing a takeup leader with increased flexibility. A first advantage of the present takeup leader is that the increased flexibility prevents the tape drive from realizing the erratic behavior caused by a deformed takeup leader. The increased flexibility permits the tape drive to pull a deformed takeup leader through the curvilinear tape path with a substantially smooth motion. A second advantage of the present takeup leader is that it provides a low cost solution to a problem that can affect large quantities of tape drives during a single incident, namely, erratic operation caused by deformation of the takeup leader. A third advantage of the present takeup leader is that the increased flexibility results in improved winding and unwinding efficiencies during the loading and unloading operations of the tape drive. A fourth advantage of the present takeup leader is that the flexibility is improved while the requisite tensile strength required to pull the tape media through the tape path is preserved.

The present takeup leader comprises an elongated main body integrally formed between a first end and a second end. The first end includes a pair of flanges that connect the takeup leader to the takeup reel in the tape drive. The second end includes a stem and tab for detachably connecting to the tape cartridge leader. In one example of the present takeup leader, the elongated main body includes a plurality of apertures located in at least one section that wraps around one of the guide rollers in the tape path when the tape drive is in an unloaded condition. In another example of the present takeup leader, the apertures are arranged along the entire length of the elongated main body in a linear pattern and correspond to all of the sections in the elongated main body that wrap around guide rollers. In yet another example of the present takeup leader, the apertures are arranged along the entire length of the elongated main body in a staggered pattern. In still yet another example of the present takeup leader, the plurality of apertures are formed in a plurality of groups. The location of each of the plurality of groups corresponds to a section of the elongated main body that wraps around one of the guide rollers in the tape path when the tape drive is in an unloaded condition. The apertures formed in the present takeup leader are formed in at least one of a geometric shape including without limitation, circular, ovular, square and rectangular.

BRIEF DESCRIPTION OF THE DRAWINGS

FIG. 2 illustrates an example of a prior art takeup leader connected to a tape cartridge leader;

FIG. 3 illustrates a takeup leader according to the present invention connected to a tape cartridge leader;

DETAILED DESCRIPTION

Figure 1:
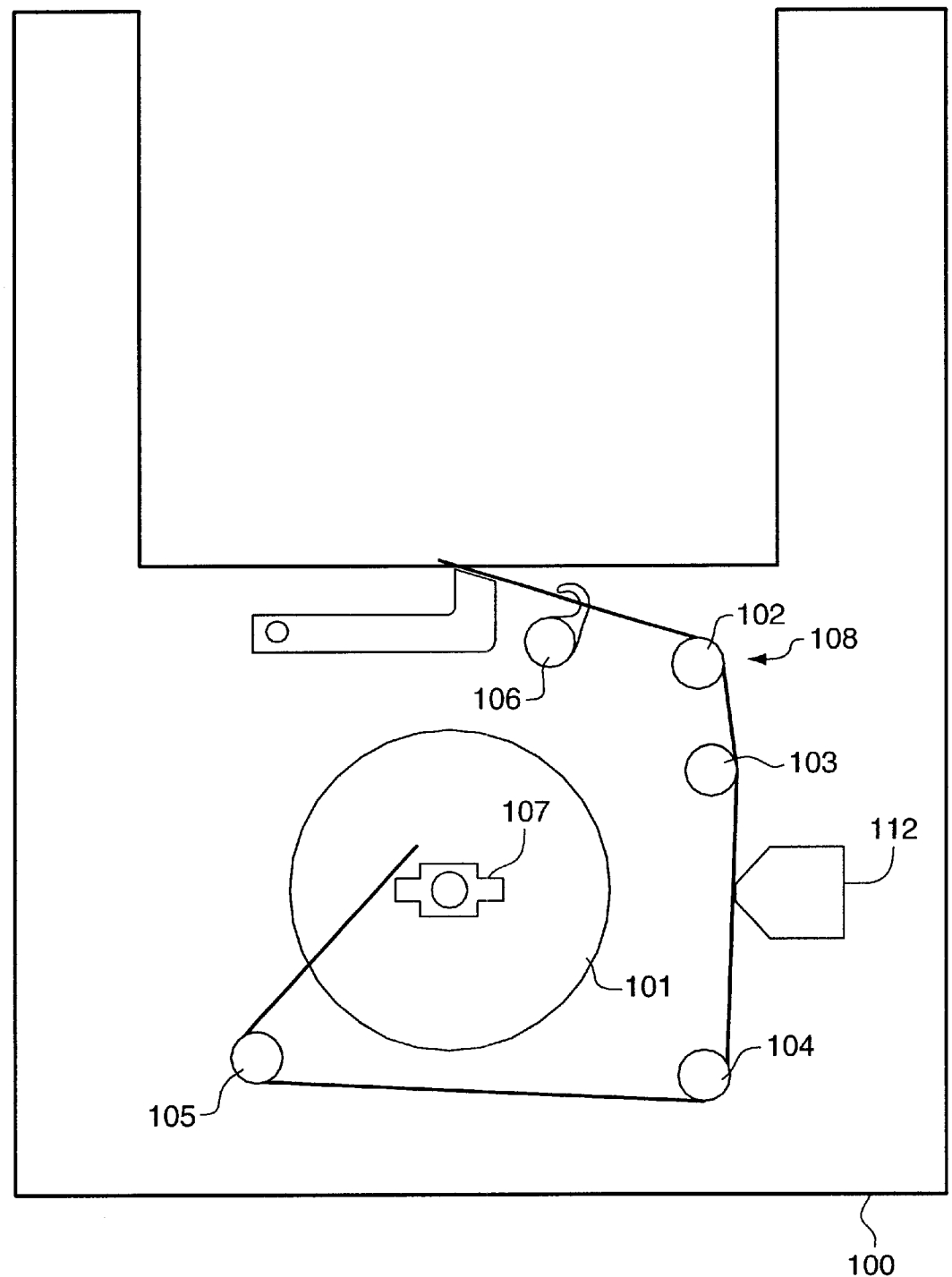
FIG. 1 illustrates an example of a single reel tape drive that could incorporate a takeup leader according to the present invention.

FIG. 3 illustrates an example of a takeup leader 300 according to the present invention. It is anticipated however, that one skilled in the art will recognize numerous other examples in accordance with the principles described below, and thus, the following examples are for the purpose of illustration and not limitation. Those skilled in the art will also appreciate that various described features could be combined to form multiple variations of the invention.

Advantageously, the present takeup leader 300 is similar in design and function to the conventional takeup leader 201 and is configured for use in a conventional tape drive e.g. 100. The takeup leader 300 comprises an elongated main body 301 integrally formed between a first end 304 and a second end 305. A pair of flanges, 206 and 207, are integrally formed in the first end 304, and a stem 204 and tab 205 are integrally formed in the second end 305. The pair of flanges, 206 and 207, are configured to detachably connect the takeup leader 300 to the takeup reel 101 in a conventional manner through corresponding slots (not shown) formed in the takeup reel 101. The stem 204 and the tab 205 are configured to buckle with the tape cartridge leader 203 when a tape cartridge (not shown) is inserted into the tape drive 100. The elongated main body also includes the aperture 209 used to detect when the takeup leader 201 and the tape cartridge leader 203 are unbuckled, the aperture 210 that accommodates the increased height of the buckle 200, and the aperture 208 used to retain the takeup leader 300 on the catch 106 when the tape drive 100 is in the unloaded condition.

The elongated main body 301 of the takeup leader 300 comprises a plurality of geometrically shaped apertures, e.g. 302 and 303, formed in the elongated main body 301. The apertures, e.g. 302 and 303, reduce the torsional bending stiffness and increase the flexibility of the takeup leader 300 so that a permanent deformation does not cause erratic behavior in the tape drive 100 operation. The increased flexibility permits a takeup leader, e.g. 300, that has become deformed, to easily straighten as it is pulled over the guide rollers 102–105. Advantageously, the increased flexibility also improves the winding operation of the tape drive 100. The increased flexibility reduces the amount of torque required to wind a non-deformed takeup leader 300 through the curvilinear tape path defined by the guide rollers 102–105. Similarly, the apertures, e.g. 302 and 303, increase friction and improve contact between the takeup leader 300 and the guide rollers 102–105. The apertures, e.g. 302 and 303, allow air trapped between the guide roller surface and the takeup leader 300 to escape, resulting in improved winding of the takeup leader 300 and tape cartridge leader 203.

In one exemplary example of the present takeup leader 300, for a conventional DLT tape drive having a takeup leader measuring 13.06 inches in length, the elongated main body 301 comprises twenty circular apertures, e.g. 302 and 303, of a 0.28-inch diameter. The apertures, e.g. 302 and 303, are symmetrically spaced 0.27 inches apart. The first aperture 302 is positioned 0.27 inches from the sensing aperture 209 as illustrated by FIG. 2. This configuration results in five apertures, e.g. 302 and 303, between the sensing aperture 209 and the buckle aperture 210, and fifteen apertures between the buckle aperture 210 and the first end 304 of the takeup leader 300. It should be noted that the spacing, quantity, and geometric shape of the apertures could vary as a matter of design choice, so long as the apertures are formed in the elongated main body 301 at locations corresponding to curvilinear points in the takeup leader when the tape drive is in the unloaded condition, illustrated by FIG. 1. Advantageously, the configuration of FIG. 3 provides the improved winding characteristics and permits a deformed takeup leader, e.g. 300, to be smoothly pulled through the curvilinear tape path while providing sufficient tensile strength to withstand the forces applied on the takeup leader 300 during winding and unwinding.

Figure 4:
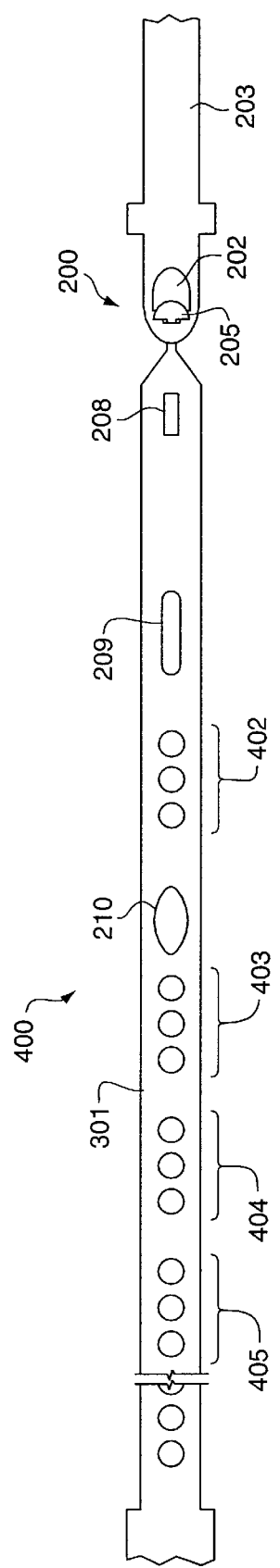
FIG. 4 illustrates another example of a takeup leader according to the present invention connected to a tape cartridge leader.

FIG. 4 illustrates another example of the present takeup leader, namely takeup leader 400. In this example, the apertures, e.g. 302 and 303, are formed in groups 402–405. The aperture groups 402–405 are formed at locations in the elongated main body 301 that wrap around each of the guide rollers 102–105 when the tape drive is in the unloaded condition. Each group, e.g. 400, corresponds to a curvilinear point, e.g. 108, around a guide roller, e.g. 102, that is likely to deform, to increase flexibility in the takeup leader 400 at that point. Advantageously, this reduces the overall number of apertures, e.g. 303 and 304, required to allow smooth operation of the tape drive 100 in the event the takeup leader 400 becomes deformed. However, the overall flexibility of the takeup leader 400 would be less than the overall flexibility of the takeup leader 300 because of the reduced number of apertures, e.g. 303 and 304. In alternative examples, one or more of the aperture groups, e.g. 402, could be replaced by one or more ovular or rectangular apertures corresponding to the curvilinear sections of the takeup leader 400 that wrap around each of the guide rollers 102–105. For example a single rectangular aperture formed in a parallel orientation with the takeup leader 400 could replace aperture group 402.

Figure 5:
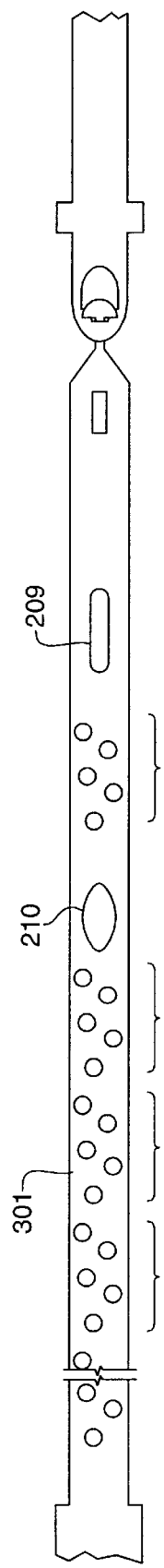
FIG. 5 illustrates another example of a takeup leader according to the present invention connected to a tape cartridge leader.

FIGS. 5 illustrates an alternative example of the present takeup leader. Those skilled in the art will appreciate that the precise pattern and the quantity of apertures in a takeup leader incorporating the principles of the present invention may vary as a matter of design choice. For example, the apertures could be formed in other geometric shapes including without limitation, circular, ovular, square and rectangular shapes. In another example of the present takeup leader, the apertures could be formed in a staggered pattern along the length of the elongated main body 301, as illustrated by FIG. 5.

Those skilled in the art will appreciate that the above described principles could be applied to other takeup leader designs to realize the advantages of the present invention. Those skilled in the art will also appreciate variations of the above-described embodiments that fall within the scope of the invention. As a result, the invention is not limited to the specific examples and illustrations discussed above, but only by the following claims and their equivalents.

What is claimed is:

1. A takeup leader for a single reel tape drive that detachably connects to a tape cartridge leader terminating a magnetic tape media contained on a supply reel in a single reel tape cartridge that is loaded into the tape drive so that the magnetic tape media can be wound through a curvilinear tape path internal to the tape drive, the takeup leader comprising:

an elongated main body integrally formed between a first end and a second end, wherein the first end is connected to a takeup reel in the tape drive;

means within the second end for detachably connecting to the tape cartridge leader when the tape cartridge is loaded into the tape drive; and means within the elongated main body for increasing flexibility in at least one section of the elongated main body that corresponds to a curvilinear point around at least one guide roller in the curvilinear tape path when the tape drive is in an unloaded condition.

2. The takeup leader of claim 1, wherein the means for increasing flexibility increases flexibility in a plurality of sections of the elongated main body that correspond to a plurality of curvilinear points around a plurality of guide rollers in the curvilinear tape path when the tape drive is in the unloaded condition.

3. The takeup leader of claim 1, wherein the means for increasing flexibility comprises:

a plurality of apertures formed in the at least one section of the elongated main body.

4. The takeup leader of claim 3, wherein the means for increasing flexibility comprises:

a plurality of apertures formed in a plurality of groups in the plurality of sections of the elongated main body.

5. The takeup leader of claim 3, wherein the plurality of apertures are formed along the length of the elongated main body of the takeup leader.

6. The takeup leader of claim 5, wherein the plurality of apertures are formed in at least one of a geometric shape from the class of geometric shapes including: circular, ovular, square and rectangular.

7. The takeup leader of claim 5, wherein the plurality of apertures are formed in a linear pattern along the elongated main body of the takeup leader.

8. The takeup leader of claim 5, wherein the plurality of apertures are formed in a staggered pattern along the elongated main body of the takeup leader.

9. The takeup leader of claim 1, wherein the means for connecting the takeup leader to the tape cartridge leader comprises:

a stem and a tab integrally formed in the second end of the takeup leader.

* * * * *